United States Patent [19]

Boucher et al.

[11] Patent Number: 4,555,938
[45] Date of Patent: Dec. 3, 1985

[54] MARINE INSTRUMENT

[75] Inventors: Stephen G. Boucher, Amherst; Robert K. Jeffers, Concord, both of N.H.

[73] Assignee: Airmar Technology Corporation, Amherst, N.H.

[21] Appl. No.: 616,289

[22] Filed: Jun. 1, 1984

[51] Int. Cl.[4] ............................................. G01C 21/10
[52] U.S. Cl. ...................................... 73/187; 324/167; 324/174
[58] Field of Search ............. 73/187, 185, 189, 272 R; 374/142; 324/173, 174, 167

[56] References Cited

U.S. PATENT DOCUMENTS

| Re. 28,839 | 6/1976 | Overs | 73/187 |
|---|---|---|---|
| 128,324 | 6/1872 | Pierce | 73/187 |
| 3,287,969 | 11/1966 | Hardy | 73/187 |
| 3,400,582 | 9/1968 | Warner | 73/181 |
| 3,433,065 | 3/1969 | Mergler | 73/187 |
| 3,457,782 | 7/1969 | Maeder et al. | 73/187 |
| 3,496,770 | 2/1970 | Fassett II | 73/187 |
| 3,531,988 | 10/1970 | Casani et al. | 73/187 |
| 3,548,654 | 12/1970 | Cole, Jr. | 73/187 |
| 3,706,224 | 11/1972 | Overs | 73/187 |
| 4,038,870 | 8/1977 | Rotier | 73/181 |
| 4,110,727 | 8/1978 | Kriege | 340/10 |
| 4,206,637 | 6/1980 | Pankonien | 73/187 |
| 4,324,135 | 4/1982 | Peyton | 73/187 |

FOREIGN PATENT DOCUMENTS

| 2449896 | 10/1980 | France | 73/187 |
|---|---|---|---|
| 0053428 | 5/1981 | Japan | 374/142 |

Primary Examiner—Donald O. Woodiel
Attorney, Agent, or Firm—Hamilton, Brook, Smith & Reynolds

[57] ABSTRACT

A marine speed sensor mounted in a housing which may also include a temperature sensor and a sonic transducer. The speed sensor includes a paddlewheel for producing an electromagnetic field. The paddlewheel is rotatably mounted adjacent the housing and exposed at top and bottom and mounted between support members extending from the housing.

18 Claims, 2 Drawing Figures

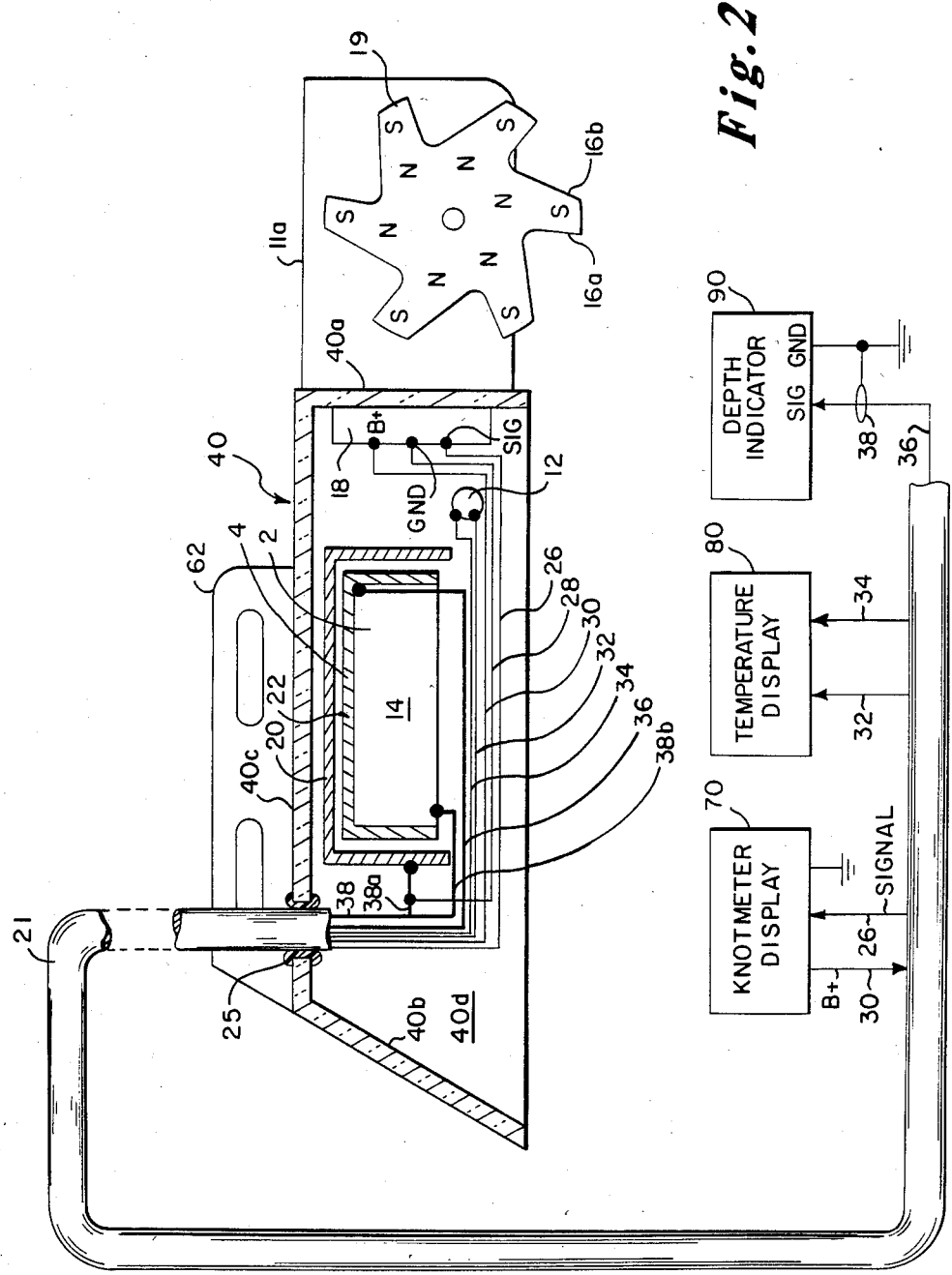

MARINE INSTRUMENT

TECHNICAL FIELD

This invention is in the field of marine instrumentation for providing information with respect to the speed of a marine vehicle through water, and the depth and temperature of the water.

BACKGROUND ART

Instruments for measuring and displaying speed or velocity of a marine vessel through water have utilized a wide variety of sensors (See, for example, U.S. Pat. No. 4,206,637—paddlewheel interrupts photodetector; U.S. Pat. Nos. 3,531,948; 3,496,770; 3,457,782—paddlewheel with magnet on each paddle or paddle made of magnetic field permeable material which is sensed by electromagnetic pick-up coil; and U.S. Pat. No. 3,706,224—paddlewheel with magnet on each paddle which interrupts current flow in a circuit).

Similarly, numerous instruments exist for providing sonic signals for depth sounding or fish locating. (See, for example, U.S. Pat. No. 4,110,727 and various references cited therein.)

It has also been found helpful for marine navigation and fish finding to measure water temperature by various means.

A need exists, however, for a low cost, instrument which will provide information with respect to all three parameters of speed, temperature and distance in a convenient integrated assembly for ease in mounting.

For the most part, prior art speedometers are mounted through the hull of the vessel requiring the drilling of a large hole in the hull and the attendant sealing problems (See the knotmeter of U.S. Pat. No. 3,531,988). Additionally, with the exception of the transom mounted speedometer, it is customary to completely enclose the paddlewheel speed sensor except for a small portion in which the paddle extends into the water (See U.S. Pat. No. 3,457,782, for example). In such "closed cavity" devices, the speed sensor becomes non-linear at higher speeds of, for example, in excess of 35 miles per hour.

Accordingly, a need exists for an integrated sensor system which will enable display of speed, water depth and water temperature over a wide range of parameters and especially at speeds in excess of about 35 miles per hour.

Lastly, it is important that the sensed signals of speed, temperature and depth should be adequately isolated from each other to prevent interference between signals and resultant display error. This is especially relevant in the case of interference between the relatively small echo return signals received from sonic transducer signalling. In an integrated assembly which includes all three sensors, it is difficult to suppress such interference.

DISCLOSURE OF THE INVENTION

In the apparatus of the present invention, a sensor housing is provided for enclosing (1) a sonic transducer assembly, (2) a temperature sensor comprising, for example, a thermistor, and (3) a solid state electromagnetic sensor comprising a Hall-effect device. The housing consists of a top end wall and four side walls, one of which is angularly inclined from top to bottom at an angle of about 20 degrees to conform to the inclination of the transoms of some vessels and enable mounting the housing on such transoms. Support members comprising planar struts are fixedly attached to a side wall opposite the inclined wall. An impeller, or paddlewheel, is rotatably supported from the struts such that only the portion of the paddles below the struts is immersed in the water in operation when the housing is suitably mounted on the transom and the marine vessel is at planing speeds. Thus, the paddlewheels merely pierce the water and are not required to move water around a cavity, as in hull mounted enclosed paddlewheel speed sensors. For this reason, cavitation does not occur at higher speeds. Furthermore, the paddles are asymmetric in shape, in that the "leading" or front surface of the paddles is inclined at a different angle of inclination than the "trailing" or back surface of the paddles to maximize the difference in coefficients of drag between back and front surfaces, thereby avoiding stalling at low speeds. The large difference between fore and aft impeller coefficients of drag not only eliminate impeller stall, but yields almost linear pulse output at low speeds.

The paddlewheel or impeller is formed of amorphous magnetic material and the blades are magnetized to provide alternate North-South poles. As the marine vessel moves through water, the paddlewheel rotates at a rate proportional to the velocity of the vessel. A Hall-effect device mounted inside the housing adjacent the support members senses the change in electromagnetic field as the polarized paddlewheels pass by and generates a square wave signal of 5–14 volts D.C. in amplitude; the frequency of which is proportional to vessel speed.

The sonic transducer is centrally located inside the housing and is provided with a metallic coaxial shield enclosure between it and the Hall-effect speed sensing device to prevent reciprocal interference between the signals generated by the Hall-effect device and the sonic transducer. The metallic shield is also interposed between the sonic transducer and the wall mounted temperature sensor, thereby similarly reducing mutual interference between the two devices. Electrical leads running from the sonic transducer, Hall-effect device, and thermal sensor are coupled to appropriate amplifiers and display devices on the vessel over a shielded cable through an opening in the end wall of the sensor housing.

BRIEF DESCRIPTION OF THE DRAWINGS

FIG. 2 is a partial block diagram, partial section along line 2—2 of FIG. 1 showing the details of the interior of housing 40 and the electrical connections from the sensors to the displays.

BEST MODE OF CARRYING OUT THE INVENTION

Figure 1:
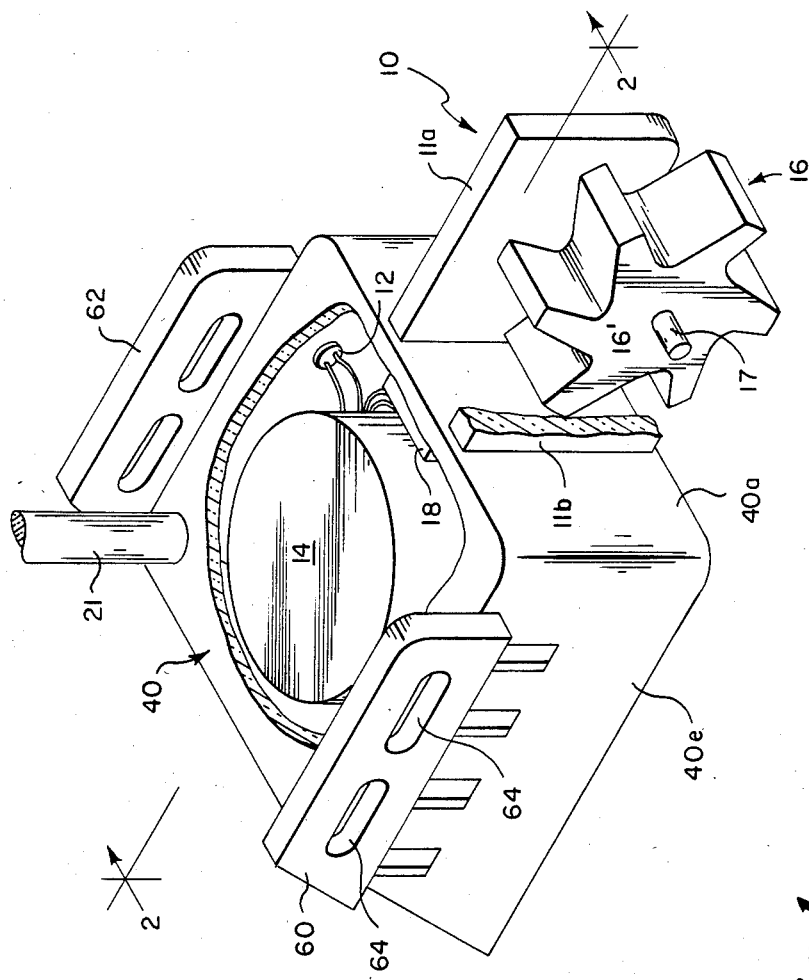
FIG. 1 is a perspective view partially cut-away of a three sensor assembly of the invention.

Referring to FIGS. 1 and 2, a speed or knot sensor is shown generally at 10 to comprise a rotatable paddlewheel or impeller, rotatably mounted on shaft 17 supported between struts 11A and 11B, which are affixed to side wall 40A of sensor housing 40.

The speed sensor also includes an electromagnetic sensing device 18 which preferably operates on the Hall-effect principle. Sensor 18 is mounted on the interior side of wall 40A within housing 40 and laterally adjacent between brackets 11A and 11B.

The paddlewheel 16 consists of a hub portion 16' from which extend six paddles 19. The paddlewheel is formed of amorphous magnetic material, such as barium ferrite by an injection molding process. After formation of the paddlewheel 16, the paddles may be electromagnetically polarized in a magnetic field such that the polarity of the six paddles at the tip alternates from North to South, as shown in FIG. 2. Alternatively, the hub may be of one polarity and each of the paddles of an opposite polarity. Other possible polarity patterns are contemplated depending on the sensor application. In any event, as the paddles rotate about the shaft, the variation in electromagnetic field caused by the polarity changes is sensed by the Hall-effect device 18 mounted on the interior of side wall 40A adjacent to the paddlewheel.

The front and back surfaces 16a and 16b, respectively, of the six paddles, or impeller blades, 19 are angularly offset from each other to form an asymmetric shape which maximizes the difference in coefficient of drag between the front and back sufaces. Thus, as may be seen in FIG. 2, front surface 16a extends almost radially from the hub and consequently has a relatively high coefficient of drag, whereas back surface 16b extends tangentially from the hub and has a lesser coefficient of drag as it passes through the water. With this paddle configuration, the tendency to stall at lower speeds is greatly reduced.

The housing 40 is made of an electromagnetically permeable material, such as polycarbonate. Housing 40 consists of a plastic enclosure formed of a top end wall and four side walls, respectively 40C, 40A, 40B, 40D and 40E. Side wall 40B is inclined at an angle of about 20 degrees from top to bottom, so as to enable convenient mounting of the sensor housing onto the transom of a marine vessel, some of which have similarly inclined transoms. Members 60 and 62 are affixed to side walls 40E and 40D, respectively. These members are provided with apertures 64 and 66 to which mounting brackets (not shown) may be secured for mounting the housing onto the transom.

A sonic transducer assembly 14 is centrally mounted within housing 40. Sonic transducer assembly 14 comprises a copper, or other electrically conductive material, forming an electromagnetic shielding cup or enclosure 20 about a piezoelectric transducer, shown generally at 22. Piezoelectric transducer 22 consists of a piezoelectric element 2 and a resilient backing member 4, preferably consisting of cork material or equivalent. Cork material 4 encloses piezoelectric element 2 at the top and sides of the generally circular piezoelectric crystal 2. Electrical leads 38 and 36 are provided in electrical contact with the bottom and top, respectively, of piezoelectric element 2.

A thermal sensing device, such as a well-known thermistor 12, is mounted on side wall 40D of housing 40, as shown in FIGS. 1 and 2. Electrical leads 34 and 32 are attached to the output of thermal sensor 12. Similarly, electric leads 30, 26 and 28 are attached to Hall-effect device 18, as shown more particularly in FIG. 2. All of these leads are coupled out of the top of housing 40 through an opening provided in top wall 40C in a cable 21 which runs through grommet 25. Thus, as shown in FIG. 2, cable 21 includes six electrical leads which provide the input and output signals to knot meter display 70, temperature display 80 and depth indicator 90.

The ground connections for the device depend upon whether a balanced or unbalanced line is connected to the piezoelectric element 2. In the configuration shown in FIG. 2, an unbalanced line connection is shown to include a coaxial cable consisting of inner conductor 36 and outer sleeve conductor 38. Conductor 38 is the shield or ground lead and it is coupled to copper shield 20 by portion 38a of shield lead 38. Conductor 36 is the signal lead and it is connected to the top surface of piezoelectric element 2. Center lead 28 from Hall-effect device 18 is also coupled to ground by being coupled to shield 20, either directly or (as shown) by being attached to ground shield wire 38a. The combination of the grounded shield, and the copper shield enclosure 20, provides interference free coupling of signals from the interior of housing 40 to the three display devices 70, 80 and 90, mounted on the marine vessel.

In an unbalanced line configuration, the bottom face of element 2 is grounded via shielded wire portion 38b, as shown in FIG. 2. In a balanced line, lead 38b is deleted and the front/bottom face of element 2 is electrically "floating" or not grounded. B+ voltage is supplied from a power supply (not shown) in display 70 via lead 30 to device 18. The speed output signal is fed from device 18 via lead 26 to the signal input terminal of display 70.

The temperature circuit through thermistor 12 is completed from lead 32 at display 80 through the thermistor and back to the display 80 via lead 34. Similarly, the depth signal lead 36 at the top face of element 2 is fed to the signal input terminal of indicator 90 and the grounded shield 36 of the coaxial cable is grounded at indicator 90.

The entire inner portion of housing 40 is encapsulated in potting material, such as polyurethane to insure water-tight encapsulation and at the same time, provide a path for sonic energy from piezoelectric element 2 to travel unimpeded out the bottom of housing 40. Piezoelectric element 2 may comprise well-known lead zirconate titanate material, or barium titanate or other equivalent material.

The purpose of the cork material 22 enclosing the top and side walls of piezoelectric element 2, is to provide a barrier against unwanted transmission of sonic waves toward the top of enclosure 40, rather than in the preferred direction, out the bottom.

In operation, the paddlewheel impeller of speed sensor 10 is adapted to mount on the transom of a vessel in a position such that the paddles 19 pierce the surface of the water when the vessel is planing. Also, the paddlewheel is open at the rear, top and bottom. Therefore, the impeller blades or paddles are not attempting to move water around an enclosed cavity. This greatly improves the linearity of the speed sensor, especially at speeds in excess of 35 miles/hr. since cavitation would normally occur at these high speeds in an enclosed paddlewheel construction.

As the paddlewheels rotate past Hall-effect device 18, ADC alternating squarewave voltage signal of an amplitude approximately equal to the DC input voltage, i.e., typically 5–18 volts DC, is generated. The frequency of the voltage signal is directly proportional to the rotational speed of the paddle-wheel and therefore to the velocity of the vessel. As previously mentioned, a DC signal, labelled B+ in FIG. 2, is provided from a power supply (not shown) over lead 30 through cable 21 to Hall-effect device 18. The system will operate at an DC voltage between 5–18 volts. The output signal from Hall-effect device 18 is coupled via lead 28 through cable 2P to the input signal terminal of knot meter display 70. The remaining lead 26 from Hall-effect device is grounded to copper shield 20 and to housing 40.

EQUIVALENTS

This completes the description of the invention. It should be understood that the invention is not to be limited to the specific embodiment set forth herein, but only by the scope of the following claims, which will be provided with the full range of equivalency to which such claims are entitled.

For example, it may be desirable to utilize only the speed sensor in some applications. In other applications, the speed sensor and depth indicator may be utilized instead of all three devices.

We claim:

1. A marine transducer device for mounting to the exterior transom of marine vessels comprising:
   (a) a housing having a top wall and enclosing side walls in which an electromagnetic sensor is mounted;
   (b) a pair of support members externally attached to said housing and extending laterally therefrom;
   (c) a paddlewheel rotatably mounted in a vertically unenclosed partially submerged position between said support members for generating a patterned electromagnetic field which extends from the paddlewheel to the sensor;
   (d) lead wires coupled to said sensor for coupling electrical signals generated by said sensor, as said paddlewheel rotates, to display devices on said marine vessel.

2. The device of claim 1 in which the electromagnetic sensor is a Hall-effect device and the signal is a voltage which varies in accordance with the rotational speed of the paddlewheel.

3. The device of claim 2 in which the paddlewheel is formed of amorphous magnetic material.

4. The device of claim 1 said paddlewheel comprising a wheel with a plurality of paddles on the peripheral of the wheel, said paddlewheel being vertically located between the support members in a position such that only a portion of the paddewheel is immersed in water when the device is mounted on the vessel and the vessel is operated at planing speeds, and in which the paddles of the paddlewheel are asymmetrically shaped to provide a difference in coefficient of drag between the front and back surfaces of the paddle.

5. The device of claim 1 in which the support members are struts extending from the housing.

6. A combination sonic transducer and speed sensor for transom mounting on marine vessels as a unitary structure comprising:
   (a) a sensor housing having an exposed planar face with an end wall and an enclosing side surface forming a cavity in which are housed
      (i) a sonic transducer device, and
      (ii) an electromagnetic sensor means for generating electric signals in response to changes in electromagnetic fields;
   (b) said sonic transducer device comprising an electrically conductive enclosing cavity with an exposed planar face forming an electromagnetic shield within which a piezoelectric crystal is disposed; said crystal having opposing end walls; a pair of electrical leads, the first lead of which is electrically attached to one end wall, the second lead being electrically attached to the remaining end wall and also to said cavity; the pair of electrical leads extending through an opening in said housing to indicating devices;
   (c) a paddlewheel for generating a patterned electromagnetic field rotatably mounted on struts affixed to an external surface of said cavity laterally adjacent said electromagnetic sensor and vertically unenclosed, the paddles of said paddlewheel being disposed to partially extend into water when said sensor housing is mounted on said vessel.

7. The combination of claim 6 in which the paddles are asymmetric in shape.

8. A sensor device for external mounting on marine vessels comprising:
   (a) a housing having an end wall and enclosing side walls in which are mounted a sonic transducer, and an electromagnetic sensor;
   (b) struts externally attached to said side walls adjacent said electromagnetic sensor;
   (c) a paddlewheel rotatably mounted between said struts and vertically unenclosed for generating an electromagnetic field extending to said electromagnetic sensor;
   (d) lead wires coupled to said transducer and sensor for coupling electrical signals generated by said sensor and transducer to display devices on said marine vessel.

9. The device of claim 8 including a temperature sensor mounted in said housing with lead wires coupled to a display device on said vessel.

10. The device of claim 8 in which the paddles of the paddlewheel are asymmetric in shape to provide a larger coefficient of drag on the front surface of the paddle than on the rear surface.

11. The device of claim 8 in which the struts are planar support members adjacent the side faces of the paddle and do not extend over the paddlewheel.

12. A combination sonic transducer and speed sensor for marine vessels comprising:
   (a) a housing having an exposed planar face with an end wall and an enclosing side surface forming a cavity in which are mounted a sonic transducer device and an electromagnetic sensor means for generating electric signals in response to changes in electromagnetic fields;
   (b) said sonic transducer device comprising a metallic enclosing cavity forming an electromagnetic shield within which a piezoelectric crystal is disposed; said crystal having opposing end walls; resilient backing means formed over one end wall, a pair of electrical leads, the first lead of which is electrically attached to the end wall adjacent said backing means, the second lead being electrically attached to the remaining end wall and also to said metallic cavity; the pair of leads extending through an opening in said housing to indicating devices;
   (c) a magnetized paddlewheel rotatably mounted on an external surface of said cavity adjacent said electromagnetic sensor and unenclosed vertically, the paddles of said paddlewheel being disposed to partially extend into water when said sensor housing is mounted on said vessel and the vessel is planing.

13. The combination of claim 12 further including temperature sensor means mounted within said housing and electrically coupled to a temperature indicating device on said vessel.

14. The combination of claim 12 in which the paddles have a higher coefficient of drag when rotating in one direction than in the other.

15. The combination of claim 12 wherein the paddlewheel is mounted on struts extending from the housing.

16. The combination of claim 15 in which the paddlewheel is exposed on all sides except those adjacent the struts.

17. A sensor device for marine vessels comprising:
   (a) a housing having an end wall and enclosing side walls in which are mounted a temperature sensor and an electromagnetic sensor;
   (b) support members externally attached to said side walls adjacent said electromagnetic sensor;
   (c) a paddlewheel rotatably mounted on said members and exposed on all sides except for sides adjacent said members and in operation said paddlewheel is partially submerged in the water, the paddles of said paddlewheel generating electromagnetic signals;
   (d) lead wires coupled to said sensors and extending through wall of said housing for coupling electrical signals generated by said sensors to display devices on said marine vessel.

18. A combination temperature sensor and speed sensor for marine vessels comprising:
   (a) a sensor housing having an exposed planar face with an end wall and an enclosing side surface forming a cavity in which are mounted a temperature sensor and an electromagnetic sensor means for generating electric signals in response to changes in electromagnetic fields;
   (b) a paddlewheel rotatably mounted on an external surface of said cavity adjacent said electromagnetic sensor, the paddles of said paddlewheel being disposed to partially extend into water when said sensor housing is mounted on said vessel and said vessel is planing, said paddles being formed of magnetic material.

* * * * *

UNITED STATES PATENT AND TRADEMARK OFFICE
CERTIFICATE OF CORRECTION

PATENT NO. : 4,555,938
DATED : December 3, 1985
INVENTOR(S) : Stephen G. Boucher and Robert K. Jeffers It is certified that error appears in the above—identified patent and that said Letters Patent is hereby corrected as shown below:

In the Specification

Col. 4, line 56, delete "ADC" and insert ---a DC---.

In the Claims

Claim 4, line 2, delete "peripheral" and insert ---periphery---.

Signed and Sealed this

Fourth Day of March 1986

[SEAL]

Attest:

DONALD J. QUIGG

Attesting Officer

Commissioner of Patents and Trademarks